3,049,430
EXTRACTION OF WATER FROM FOODSTUFFS
Martin Anderson, 1–H Gardenway, Greenbelt, Md.
No Drawing. Filed Oct. 11, 1961, Ser. No. 144,310
4 Claims. (Cl. 99—207)

This invention relates to the extraction of water from foodstuffs with liquid ammonia.

This application is a continuation-in-part of my prior application, Serial Number 850,030, filed November 2, 1959.

I have discovered that foodstuffs of substantially solid consistency may be dehydrated by extraction with liquid ammonia. The process of this invention is operable at low temperatures and avoids irreversible thermal and hydrolytic degradation. While this process may be performed at temperatures lower than the boiling point of liquid ammonia (—33.4° C.), it is not at all necessary that the foodstuff be frozen prior to extraction, and the well-known possibility of damage to certain foodstuffs by freezing may thus be minimized or avoided. This invention may also be practiced upon frozen foodstuffs. The purpose of this invention is, accordingly, that improvement in the dehydration of foodstuffs which comprises the extraction of water with liquid ammonia.

The process of this invention is especially of value in the dehydration of potatoes. The foodstuffs to be dehydrated may be in the raw or cooked condition. Raw potatoes are advisably treated in a comminuted condition, that is, shredded, sliced, chopped, etc. Cooked potatoes may be comminuted, mashed, or otherwise subdivided prior to dehydration. Dehydrated mashed potatoes prepared according to the present invention may be obtained in the form of a fine, free-flowing powder which may be instantly dehydrated upon the addition of water.

The following examples are illustrative of this invention.

Example 1

One hundred grams of peeled potatoes of approximately 78% water content are thinly sliced (approximately 1 mm. thickness) and immediately immersed in 1000 grams of liquid ammonia. The mixture is stirred under a nitrogen atmosphere and is maintained below —50° C. by means of a Dry Ice-acetone bath. When analysis shows approximately 7% water dissolved in the ammonia, the potatoes are removed and the ammonia distilled off at the ambient temperature. Final traces are removed in a stream of inert gas and then under reduced pressure with gentle warming.

Example 2

Example 1 is repeated on sliced potatoes subjected to the following pretreatment. The potatoes are saturated with ammonia gas at 10° C. and then carried through the foregoing procedure. This pretreatment will avoid any tissue damage which may occur through freezing. It should be emphasized, however, that frozen foodstuffs may also be extracted of water by the process of this invention whereby both water, and ice as present, may be removed from the foodstuffs.

Example 3

To 100 grams of whole white potatoes, cooked by steaming and then mashed and cooled, are added with agitation 1000 grams of liquid ammonia. The slurry is stirred for 30 minutes, the ammonia being maintained at its boiling point without external cooling. The potatoes are filtered by suction under an inert atmosphere, broken up into a powder, and dried.

The details of this invention may vary according to the particular foodstuff and the apparatus available. An immersion of the foodstuff in a container of liquid ammonia is often satisfactory for a partial dehydration. The extractions may be performed continuously or batchwise and in a concurrent or countercurrent manner, the latter procedure being preferred for commercial processes.

The separation of foodstuff from solvent may be by filtration, centrifugation, etc.

Liquid ammonia will, of course, impregnate the foodstuff in proportion to the water extracted and may be readily removed by vaporization. Remaining traces may be removed by gentle heating, reduced pressure, and/or a stream of inert gas. Sulfur dioxide or carbon dioxide may be used to neutralize final traces of ammonia. The ammonia used for extraction may readily be recovered by distillation and compression. Alternatively, dissolved moisture may be removed by adsorption and the ammonia recycled.

Frequently it may be found desirable to impregnate the foodstuff after dehydration. This is conveniently done by allowing an impregnating fluid to replace the ammonia removed by vaporization. The dehydrated foodstuff may be removed directly from ammonia to a bath of the impregnating fluid and treated under reduced pressure, or with heat, especially if cooking is desired. The impregnant may include gums, oils, fats, and polymeric materials. The impregnating fluid should be a material less volatile than ammonia.

It may be necessary under some conditions to inhibit the extraction of substances other than water. This is often satisfactorily accomplished by dissolving in the liquid ammonia one or more solutes. Among inorganic solutes which might be employed are the nitrates of sodium and the alkaline earths, and the sodium halides. Sugars and other carbohydrates are among the organic solutes which may be employed.

The extraction may be performed at pressures greater than atmospheric. At atmospheric pressure the extraction temperature will be at or below —33.4° C., the boiling point of ammonia. The presence of dissolved solutes will raise the boiling point, and under such conditions the extraction can accordingly be performed at higher temperatures. The extraction temperature will, however, not be greater than the boiling point of liquid ammonia under operating conditions. Within this limitation, the extraction may be performed under pressure and in accordance with the gas laws at ambient, or greater, temperatures maintained not above the boiling point of the solvent.

The process of this invention is contemplated for use with foodstuffs of solid consistency, either whole or subdivided, including comminuted and mashed. By solid consistency I mean those foodstuffs which do not exhibit fluid flow. More precisely, there is meant by the expression "foodstuffs of solid consistency" those structured foodstuffs whose water content is predominantly intracellular, rather than extracellular as in the case of juices of the like, whereby their essential structure is substantially unaltered by dehydration. Potatoes, both white, as exemplified above, and sweet are examples within this definition.

I claim:

1. A process for the dehydration of frozen and unfrozen foodstuffs of solid consistency, said foodstuffs having an essential structure substantially unaltered by dehydration, said process including the steps of extracting from said foodstuffs the water contained therein with a solvent comprising liquid ammonia, said extraction being performed at temperatures not greater than the boiling point of liquid ammonia under operating conditions, and the separation of said solvent from said foodstuffs, whereby water, and ice as present, are extracted from said foodstuffs in ammoniacal solution.

2. The process of claim 1 wherein said foodstuffs consist of potatoes.

3. The process of claim 2 wherein said potatoes are subdivided.

4. The process of claim 3 wherein said subdivided potatoes are in the form of cooked mashed potatoes.

References Cited in the file of this patent

UNITED STATES PATENTS

| | | |
|---|---|---|
| 978,476 | Nilson | Dec. 13, 1910 |
| 2,345,378 | Brandt | Mar. 28, 1944 |
| 2,539,544 | Levin | Jan. 30, 1951 |
| 2,603,567 | Stiles | July 15, 1952 |
| 2,729,567 | Heisler | Jan. 3, 1956 |

OTHER REFERENCES

"Drying and Dehydration of Foods," 2d edition, 1955, by Von Laesicke, Reinhold Publishing Co., New York, pages 32–33.